UNITED STATES PATENT OFFICE.

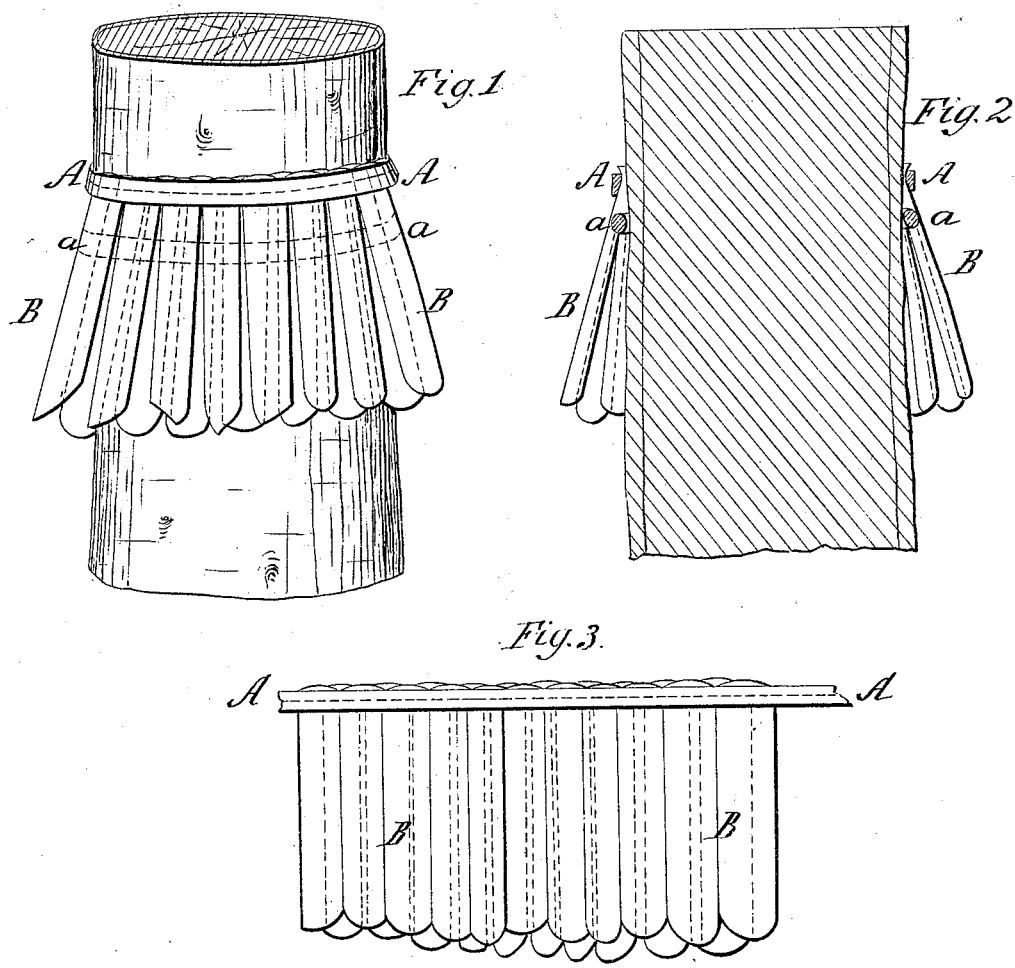

FORREST SHEPHERD, OF NEW HAVEN, CONNECTICUT.

TREE-PROTECTOR.

Specification forming part of Letters Patent No. 44,667, dated October 11, 1864.

*To all whom it may concern:*

Be it known that I, FORREST SHEPHERD, of the city and county of New Haven, and State of Connecticut, have invented a new and useful Improvement in Apparatus for Preventing Grubs, Worms, and other Insects from Ascending Trees, as a new article of manufacture; and I do hereby declare that the following is a full, clear, and exact description of the construction, character, and operation of the same, reference be had to the accompanying drawings, which make part of this specification, in which—

Figure 1 is a perspective view of a section of a tree, showing the apparatus and the manner of attaching it. Fig. 2 is a plan of the same, cut vertically through the section of the tree, showing the ends of the band and the tarred rope-yarn. Fig. 3 is a plan of a double series of plates or strips of mica attached to a band ready to be attached to the trunk of the tree.

My improvement consists in constructing an article or apparatus to prevent grubs, worms, and other insects, from ascending the trunks of trees, by attaching a series of strips or plates of mica to a suitable band, which I secure to the body or trunk of the tree in such a manner that the strips or plates of mica, when in use, will hang pendent from the band, and in binding a tarred rope or rope-yarn, or some other suitable material, around the body or trunk of the tree, just below the band, (which holds the mica plates,) on which the pendent strips or plates of mica rest, both to stop worms, &c., in their ascent and to cause the pendent parts of the strips or plates to stand out somewhat from the body of the tree, so as to allow a free vibration to their lower ends to shake off any insect which may have by any possibility crawled down on the inner side of the mica, and thus prevent any one from passing round the extreme ends.

I take a piece of thick loosely-woven woolen webbing or binding, as shown at A A, Fig. 1, or a band of any other suitably-elastic material, to which I attach, by sewing or otherwise, a series of strips or plates of mica, B B, as represented in Fig. 3, (having the lower or pendent ends very thin.) This band and its series of strips or plates of mica may be made of any indefinite length, and bought and sold by the yard, &c., and pieces cut off for use to suit the size of each tree, when desired. I would recommend that the strips or plates of mica be lapped considerably. Perhaps the best way will be to use two complete series of plates, breaking joints with each other, as represented in Figs. 3 and 1; but no precise rule need be given, as, if the plates are so lapped as to render it impossible for any insect to get through between the edges, the end will be accomplished.

To attach this apparatus to the trunk of a tree for use I first attach (a little below) a circle of tarred rope or rope-yarn, or of any other suitable material, as indicated at *a a*, Figs. 1 and 2. This tarred rope or other material should be made sufficiently soft and elastic to conform to the growth of the tree. This rope, &c., may all be saturated with any tar or other substance of strong odor, as that will tend to stupify or benumb the grubs, &c., and disable them for crawling down the nearly vertical inner side of the smooth mica plates. I attach this rope or other material by small nails, sufficient to sustain its own weight. I then pass the band A A around the trunk of the tree, just above the tarred rope *a a*, Figs. 1 and 2, as indicated at *a a*, and A A, Fig. 2, and secure it with small nails, or otherwise. I would recommend the use of coarse loose-woven woolen webbing for the band on account of its elasticity, though any other substance sufficiently elastic to conform to the growth of the tree will answer the purpose.

The plates of mica may be attached directly to the tarred rope or other material as a band; but I prefer using the separate band, as before described, as by that means the plates of mica will be steadied by both the band and rope; and instead of the strip of mica being sewed to the band, as before described, small scales of mica may be attached by shellac or any other suitable substance by their upper edges to a broad band, made to be cut into suitable lengths, and attached to the trunk of the tree by nails, or otherwise; but I prefer using the strips or plates, as before described and set forth.

The advantages of my improvement consist in the simplicity of constructing and attaching it, (as it can be made of any length by a sewing-machine, if desired, and a piece cut off to suit each tree as wanted, and any inexperienced person can attach it without any difficulty,) and in that it is not believed possible for a grub or worm to pass down to and turn the lower ends of the mica plate, (as they may be made almost infinitely thin,) so as to ascend on the outside of it, and in that no grub can crawl upward against the protruding edges of the mica scales, when secured by their upper edges, as described.

What I claim as my invention, and desire to secure by Letters Patent as a new article of manufacture, is—

An apparatus made by attaching strips or plates of mica to a band to be placed around the body of the tree to prevent the ascent of grubs, worms, and other insects, when constructed and fitted to be attached substantially as herein described.

FORREST SHEPHERD.

Witnesses:
JOHN BRADNEY,
R. FITZGERALD.